Patented Nov. 5, 1940

2,220,397

UNITED STATES PATENT OFFICE 2,220,397

METALLIZED ACID POLYAZO DYES

Moses L. Crossley, Plainfield, and Lincoln M. Shafer, Upper Montclair, N. J., assignors to American Cyanamid Company, New York, N. Y., a corporation of Maine No Drawing. Original application June 26, 1937, Serial No. 150,540. Divided and this application June 11, 1940, Serial No. 339,890

2 Claims. (Cl. 260—145)

This invention relates to metallized polyazo dyes which show excellent fastness to light.

This application is a division of our application Serial No. 150,540, filed June 26, 1937 now Patent No. 2,213,647 of Sept. 3, 1940.

The metallized dyes of the present invention are obtained by metallizing a polyazo dye having a middle component which is a dihydroxy aryl compound capable of combining with two molecules of diazo compounds in positions ortho to the two hydroxyl groups, at least one of the diazo compounds having a metallizable group such as a hydroxyl or carboxyl group ortho to the azo group and at least one end component containing a solubilizing group. The dye may be represented by the following general structural formula:

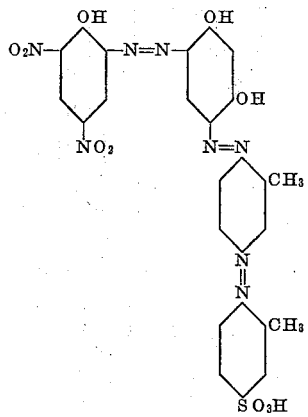

Any of the ordinary metals used in metallizing azo dyes may be employed in the present invention such as chromium, copper, iron, aluminum, nickel, tin, cobalt, cadmium, zinc, mercury, tungsten, manganese, zirconium, titanium, lead, molybdenum, antimony, tellurium, vanadium; and the sub-combinations: chromium-copper, chromium-aluminum, chromium-manganese, chromium-cobalt, chromium-vanadium, copper-vanadium, chromium-nickel, chromium-iron, copper-zinc, chromium-titanium, chromium-tin, aluminum-tin, copper-iron combination of metals react with the dye to produce a product which is not identical with the mixture of the products obtained by treating portions of the dye with separate metals. The metallic combination or complex enters into the dye molecule in some manner which is different from the reaction of a single metal. The precise form of chemical combination has not as yet been determined.

The ratio of the metal or metal complex to the dye may vary within wide limits and may depend on the nature of the metal and the number and nature of the metallizable groups in the dye molecule. Where more than one metal is to enter the molecule of the dye, it is, of course, necessary that there be a plurality of pairs of metallizable groups. Such cases would correspond to a species under the general formula in which both R and R₂ contain hydroxyl or carboxyl groups ortho to the azo groups.

The present invention is not limited to a particular process of producing the dyes. Normally they will be prepared by coupling the dihydroxy compound with a diazo compound and a diazoazo compound. Of course, the polyazo dyes may be produced by successive couplings of diazoamino compounds which are then rediazotized and further coupled. The end components may be the same or different.

Metallization is effected in the normal manner, for example, by refluxing an aqueous solution of the dye with salts or other suitable compounds of the metals or mixed metals.

In general, the new dyes are dark colored powders which are quite soluble in water and are capable of producing valuable colors of varied tones when dyed from an acid bath on wool, silk, leather, and furs. The dyes show good to excellent fastness to light, washing, fulling, acid, alkalies and sea water. The degree of fastness will vary with the particular dyes and with the metals used.

While the products have valuable properties we find that there are differences in the dyes dependent upon the metal used. For example, we have found that when dyes of the class here described are metallized with chromium, copper, cobalt, nickel and iron, extraordinary fastness to light is obtained. Excellent fastness to light is obtained when metallization is accomplished with zirconium, vanadium, aluminum and titanium. Excellent fastness to fulling is obtained when the dyes are metallized with the metals just mentioned. Combinations of two or more of these metals also give excellent results and combinations may be made of one or more of these metals with one or more of the other metals set forth herein.

The invention will be described in detail in the following example but it should be understood that the invention is not limited to the details therein set forth.

Dissolve 305 parts of amino azo toluene sulfonic acid in 1000 parts of water, cool with ice to a temperature of 10–15° C., add an amount of hydrochloric acid equivalent to 95 parts real HCl and diazotize with 69 parts of real sodium nitrite, keeping the temperature during diazotization between 10–15° C. When the diazotization is complete neutralize the excess acidity in the diazo solution with bicarbonate of soda. Dissolve 110 parts of resorcinol in 1000 parts of water. Add 200 parts of sodium acetate and cool to about 10° C. Add to this solution the above diazo solution running it in a period of about one hour, maintaining a temperature between 10 and 12° C. The reaction must not be acid to Congo. Stir until the coupling is complete, then make up a solution of sodium picramate by dissolving 221 parts in 700 parts of water. Add to this solution about 100 parts of real sulfonic acid and diazotize with 69 parts of sodium nitrite used as approx. 30% solution. Diazotization is conducted at a temperature between 25 and 30° C. When diazotization is complete, add 240 parts of soda ash to the first coupling mixture. Then run in the diazo picramic acid suspension during 15 to 30 minutes at a temperature of about 10–15° C. Stir until the coupling is complete. Then acidify with sulfuric acid until the reaction is slightly acid to Congo paper. Add 165 parts of sodium acetate, heat to 80° C., then add a solution of copper sulfate containing 270 parts of $CuSO_4.5H_2O$ dissolved in 1430 parts water. Heat to between 95 and 100° C. for about one hour, salt out the dye with sodium chloride at 90° C., filter, dry the product at 75° C. The resulting product is a brown powder soluble in water and dyes animal fibers neutral tones of brown in excellent fastness.

The formula for the dye prior to metallization, is as follows:

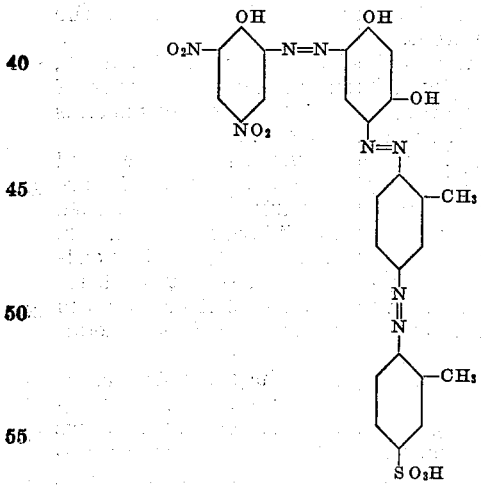

For the copper sulfate, soluble salts of chromium, iron, aluminum, nickel, manganese, cobalt, zirconium, titanium, molybdenum, tellurium and vanadium, or any other metals mentioned in the specification may be substituted and similar products obtained.

What we claim is:

1. A metallized azo dye having the following formula:

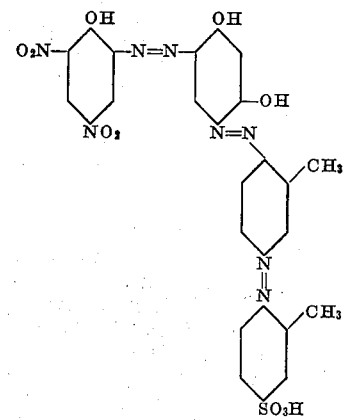

2. A complex copper compound of the azo dye having the following formula:

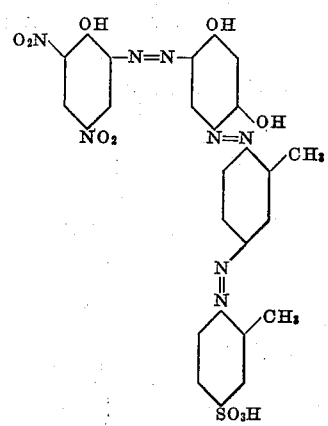

MOSES L. CROSSLEY.
LINCOLN M. SHAFER.